United States Patent [19]

Iwata

[11] Patent Number: 6,131,045
[45] Date of Patent: Oct. 10, 2000

[54] RADIO COMMUNICATION DEVICE FOR RESTRICTING SPECIFIC FUNCTION AND METHOD FOR RESTRICTING THE FUNCTION

[75] Inventor: Shinichiro Iwata, Tokyo, Japan

[73] Assignee: NEC Corporation, Tokyo, Japan

[21] Appl. No.: 08/962,612

[22] Filed: Nov. 3, 1997

[30] Foreign Application Priority Data

Nov. 5, 1996 [JP] Japan .................................. 8-292741

[51] Int. Cl.[7] ...................................................... H04B 1/40
[52] U.S. Cl. ........................ 455/565; 455/31.1; 455/31.2; 340/825.44
[58] Field of Search ............................ 379/373; 455/565, 455/31.1, 31.2, 31.3, 212, 373; 340/844.25

[56] References Cited

U.S. PATENT DOCUMENTS

| | | |
|---|---|---|
| 4,904,992 | 2/1990 | Grothause . |
| 5,224,150 | 6/1993 | Neustein ................................ 455/31.2 |
| 5,513,241 | 4/1996 | Dimitiadis et al. ..................... 455/31.3 |
| 5,805,077 | 9/1998 | Fawcett ................................ 340/825.44 |

FOREIGN PATENT DOCUMENTS

| | | |
|---|---|---|
| 0 218 936 A2 | 4/1987 | European Pat. Off. . |
| 0 509 781 A2 | 4/1992 | European Pat. Off. . |
| 0 724 244 A1 | 7/1996 | European Pat. Off. . |
| 7-87568 | 3/1995 | Japan ................................ H04Q 7/04 |
| 7-245782 | 9/1995 | Japan . |
| 7-264671 | 10/1995 | Japan ................................ H04B 7/38 |
| WO 96/00429 | 1/1996 | WIPO . |
| WO 96/29687 | 9/1996 | WIPO . |
| WO 97/14256 | 4/1997 | WIPO . |

OTHER PUBLICATIONS

European Office Action.

*Primary Examiner*—Daniel S. Hunter
*Assistant Examiner*—Alan T. Gantt
*Attorney, Agent, or Firm*—McGuire Woods, LLP

[57] ABSTRACT

A radio communication device 7 existing in a function control area 3 receives both a call signal 4 from a base station and a function control signal 5 transmitted from a function control signal transmitting device 2. The call signal 4 and the function control signal 5 have the same frequency. The call signal 4 received is converted into a predetermined block format and constitutes predetermined frames during which data errors occurred in the predetermined block is counted. After the counting, the number of data errors occurred in the predetermined block is compared with a predetermined value. On the basis of the result of comparison, it is determined whether or not the radio communication device 7 exists in a function control area 3. When it is determined that the radio communication device 7 exists in the function control area 3, the function of the radio communication device 7 is controlled and restricted.

32 Claims, 14 Drawing Sheets

Fig.11

RESERVE    INHIBIT

TOKYO  6 : 0 0  ARRIVAL

RADIO COMMUNICATION DEVICE FOR RESTRICTING SPECIFIC FUNCTION AND METHOD FOR RESTRICTING THE FUNCTION

BACKGROUND OF THE INVENTION

1. Field of the Invention

The present invention relates to a radio communication device and, particularly, a radio communication device for restricting specific functions such as call signaling function and/or talking function in a specific area.

2. Description of the Related Art

The radio communication device includes a portable telephone set, a radio selective call receiver, and so on. The portable telephone set makes talking between persons in different arbitrary areas possible. The selective call receiver exemplified by a pager, etc., can call a user of the receiver regardless of location of the user. Radio communication devices of these kinds are coming into wide use due to recent reduction of the size and cost thereof. With such wide use of the radio communication devices, a big social problem in view of manners that ringing tone and talking in a public place such as in a train bother other people has occurred. Further, traffic accident which might be caused by the use of portable telephone sets in automobiles have become substantial. Further more, erroneous operation of electronic devices mounted on an air plane or electronic medical devices such as pace-maker, etc., due to transmitted electromagnetic wave from a portable telephone set is also a concern about.

In order to prevent ringing tone and/or talking in such radio communication device, a user himself is required to operate the device to stop the ringing tone in such place or turn off a power source thereof.

Therefore, in order to prevent such radio communication device from being used in such place, a radio communication device which can restrict its functions automatically has been proposed.

For example, Japanese Patent Application Laid-open No. Hei 7-264671 discloses a typical example of such radio communication device.

The disclosed radio communication device, when called from a base station, monitors a predetermined specific channel other than communication channels including a call channel, which are always monitored. When there is any electro-magnetic wave transmitted through the specific channel, the radio communication device does not generate a ringing tone and displays on a display portion thereof an information that the ringing function is prohibited. That is, when a transmitter which transmits electromagnetic wave through a specific channel is located in a place such as train where the use of ringing function is to be restricted, the function of the transmitter is restricted.

In such radio communication device, however, an area in which the use of specific function thereof is restricted is determined according to an existence or absence of electromagnetic wave in a specific channel by monitoring the specific channel. Therefore, it is necessary to provide a new channel other than channels to be used for communication with the base station, that is, to hold a new frequency resource. However, the frequency is not an infinite resource and it is very difficult to assign a new frequency band even if it is possible. When, although it is possible to assign a new frequency band, the new frequency band is separated substantially from the frequency band for the usual communication of the radio communication device, the radio communication device has to be additionally equipped with a receiving portion and an antenna, etc., suitable for the new frequency band, causing a miniaturization of the radio communication device to become impossible.

On the other hand, it may be possible to set both a specific channel and a communication channel in the same channel. In such case, a transmitter transmits a specific pattern signal through the specific channel and a radio communication device, must determine a restricted area in which the use thereof is restricted, by receiving the specific pattern signal and recognizing the pattern. However, since, in this method, a call signal and the specific pattern signal are received from the transmitter simultaneously through the single channel, the radio communication device can not receive the specific pattern signal reliably.

As another method for restricting the use of radio communication device, it may be considered to utilize the fact that, when a transmitter transmits, for example, an electromagnetic wave without modulation through a communication channel, the radio communication device can not receive a signal in a communication channel by cross-interference with the non-modulated electromagnetic wave. In this method, however, a user of the radio communication device can not determine whether the impossibility of the use of the radio communication device is caused by a location of the user where is in an area in which the use of radio communication device is prohibited or in which receiving condition is unfavorable.

On the other hand, a mobile radio device disclosed in Japanese Patent Application Laid-open No. Hei 7-245782 is forcibly switched to a pager mode by receiving a mode switching signal transmitted from a mode switching signal sender provided in a gate of a traffic station when a user bearing the portable telephone set passes through the gate. Therefore, a communication becomes impossible in a location in which the use of the telephone set is to be prohibited.

In this mobile radio device, however, it is impossible to prevent a ringing tone from being generated in the pager mode. Therefore, the ringing tone may trouble others.

Even when a user is provided with other notifying means than the ringing tone generator, such as a vibrator, the user must switch the notifying mode from the ringing tone to the vibrator through very troublesome operation every time he enters into a specific area. Further, unless the user knows before his portable telephone set is called that the portable telephone set is located in a certain specific area, it is impossible for him to determine whether or not the notifying means should be switched.

SUMMARY OF THE INVENTION

An object of the present invention is to provide a radio communication device capable of controlling or restricting a specific function thereof with high exactitude in a certain specific area without requiring any operation of a user thereof.

Another object of the present invention is to provide a radio communication device capable of controlling or restricting a specific function thereof with high exactitude in a certain specific area without requiring any additional frequency.

In order to achieve the above objects, a radio communication device according to the present invention includes a first receiver for receiving a call signal, a first decoder for converting a receiving data into a predetermined block format to construct a predetermined frame and a function control area detector for counting occurrences of data error in the predetermined block in the first decoder. The radio communication device further compares the count of data error in the predetermined block with a predetermined value, determines upon a result of comparison whether or not the radio communication device is located in a function control area, and controls or restricts the function of a radio device according to the result of the determination.

A function control signal transmitting device for transmitting a function control signal includes a second receiver for receiving a call signal, a second decoder for converting a receiving data into a predetermined block format to construct a predetermined frame, a timing generator for generating a timing signal for only a predetermined period of the predetermined frame and a transmitter for transmitting the function control signal having the same frequency as that of the call signal during only a period during which the timing signal is generated.

In this construction of the present invention, when the radio communication device enters into a certain specific area such as a train or a hospital, the transmitter of the function control signal transmitting device transmits the function control signal having the same frequency as that of the call signal for only a predetermined time within the frame of the call signal. That is, data error is intentionally generated in a portion of data received by the radio communication device.

On the other hand, when the radio communication device receives the call signal by the first receiver, the receiver converts the received data into the predetermined block format by the first decoder thereof. After the conversion is completed, the function control area detector counts occurrences of data error in the predetermined block. After the data errors are counted, the function control area determination portion determines whether or not the radio communication device exists in the function control area, by comparing the count of the data errors with a predetermined value. When the function control area determination portion determines that the radio communication device is within the function control area, the function controller controls or restricts the function of the radio communication device.

Therefore, the radio communication device according to the present invention in which its function is controlled or restricted in a certain specific area makes a user of the radio communication device located in the specific area impossible to communicate the other and to trouble others in that area.

BRIEF DESCRIPTION OF THE DRAWINGS

These and other objects, features and advantages of the invention will become more fully apparent from the following detailed description taken in conjunction with accompanying drawings.

FIG. 11 illustrates a preferred example of a display to be performed by a display portion of the bi-directional radio selective call receiver as shown in FIG. 8;

DETAILED DESCRIPTION OF THE PREFERRED EMBODIMENTS

A radio communication system including a radio communication device of the present invention, preferably, a radio selective call receiver such as a pager, base station and a function control signal transmitting device will be described with reference to FIG. 1.

Figure 1:
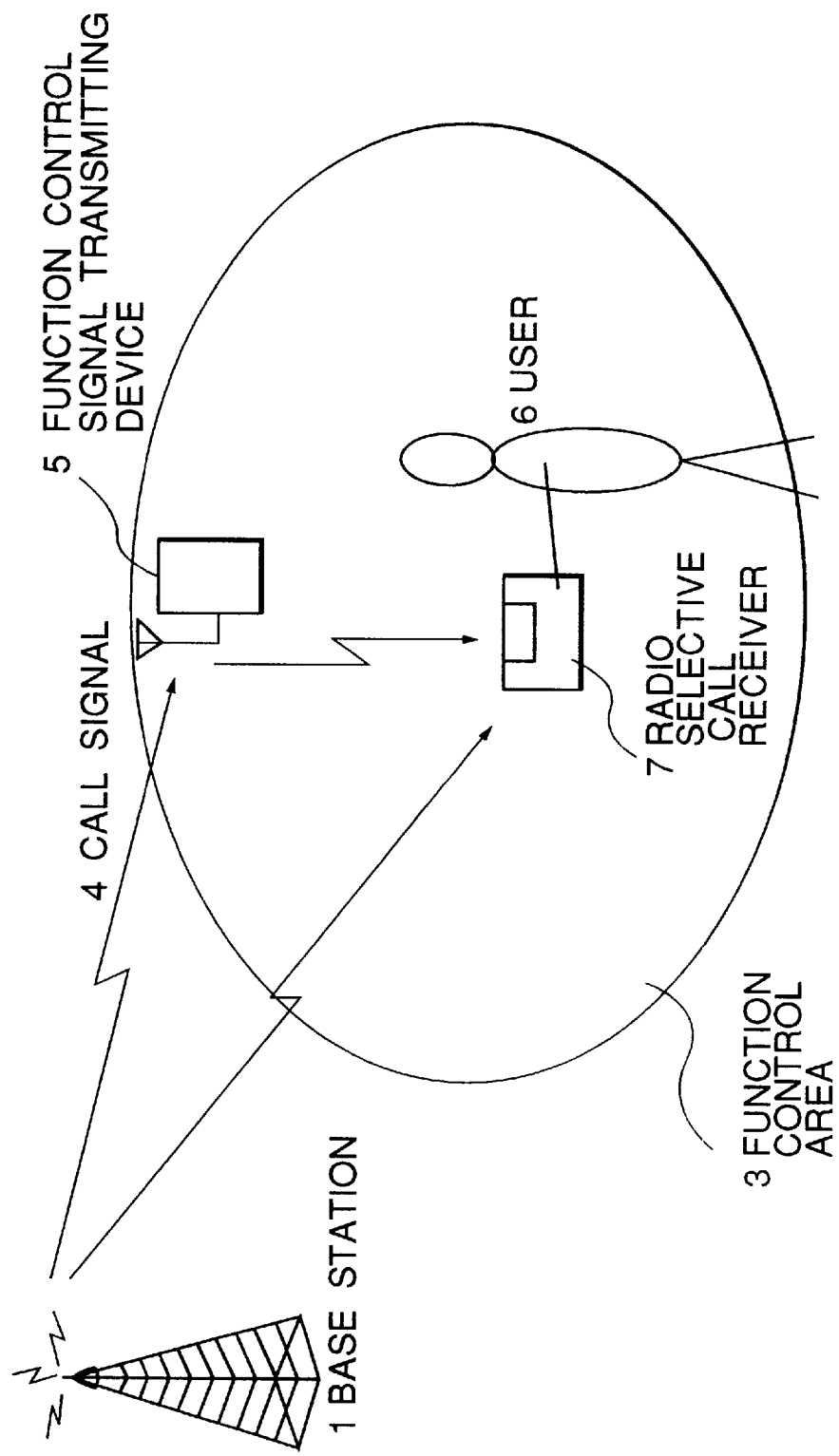
FIG. 1 illustrates a relation between a function control signal transmitting device and a radio selective call receiver according to an embodiment of the present invention.

In FIG. 1, the radio selective call receiver 7 usually receives a call signal 4 having a certain frequency transmitted from a base station 1 and determines whether or not an address information contained in the call signal 4 coincides with an address information of the radio selective call receiver 7. When the address information contained in the call signal 4 coincides with the address information of the radio selective call receiver 7, the radio selective call receiver 7 notifies a user of a incoming call.

However, when a user 6 of the radio selective call receiver 7 moves from an area which is not shown into a function control area 3, the radio selective call receiver 7 receives both the call signal 4 from the base station 1 and a function control signal 5 from a function control signal transmitting device 2. The function control signal 5 has the same frequency as that of the call signal 4 and is transmitted from the function control signal transmitting device 2 within the function control area 3 defined in the vicinity of the function control signal transmitting device 2. That is, since the call signal 4 and the function control signal 5 have the same frequency, they are interfered with each other and the function of the radio selective call receiver 7, such as call notifying function is controlled. As will be described later in detail, undesired influence of the interference is solved in the present invention. The function control signal 5 may be either a single frequency signal without modulation or a modulated signal.

A construction of the radio selective call receiver 7 as shown in FIG. 1 will be described with reference to FIG. 2.

Figure 2:
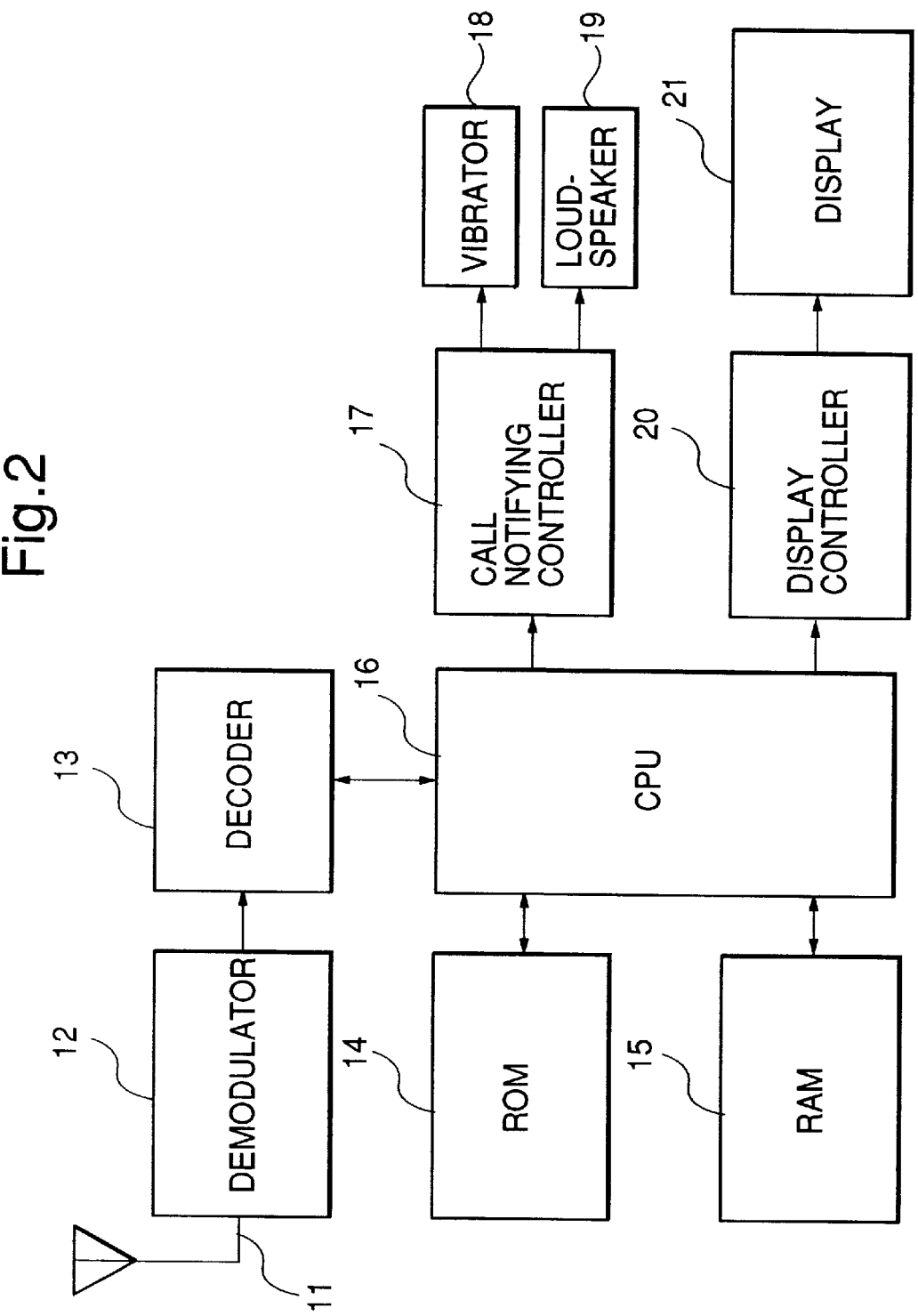
FIG. 2 illustrates a preferred example of a construction of the radio selective call receiver as shown in FIG. 1.

In FIG. 2, the call signal 4 from the base station 1 is received by a demodulator 12 through an antenna 11. The demodulator 12 amplifies and demodulates the received call signal 4 and outputs a wave-shaped digital signal. The digital signal output from the demodulator 12 is supplied to a decoder 13. The decoder 13 decodes the digital signal to complete a call signal format. Further, the decoder 13 compares the address information contained in the input signal with the address information preliminarily set in the decoder 13. When the address information contained in the input signal coincides with the address information preliminarily set in the decoder 13, the decoder 13 sends a receiving message belonging to the received address to a CPU 16. The CPU 16 stores the receiving message in a RAM 15. Further, the CPU 16 notifies the user of a incoming call by a predetermined notifying means, for example, either a vibrator 18 or a loud speaker 19, through a call notifying control portion 17. It may be possible to display the receiving message on a display portion 21 through a display control portion 20, simultaneously with the notifying. The call notifying means may includes an LED, etc.

When the radio selective call receiver 7 is located within a prohibition area, the call notifying operation is not performed as will be described later.

A construction of the function control signal transmitting device 2 as shown in FIG. 1 will be described with reference to FIG. 3.

Figure 3:
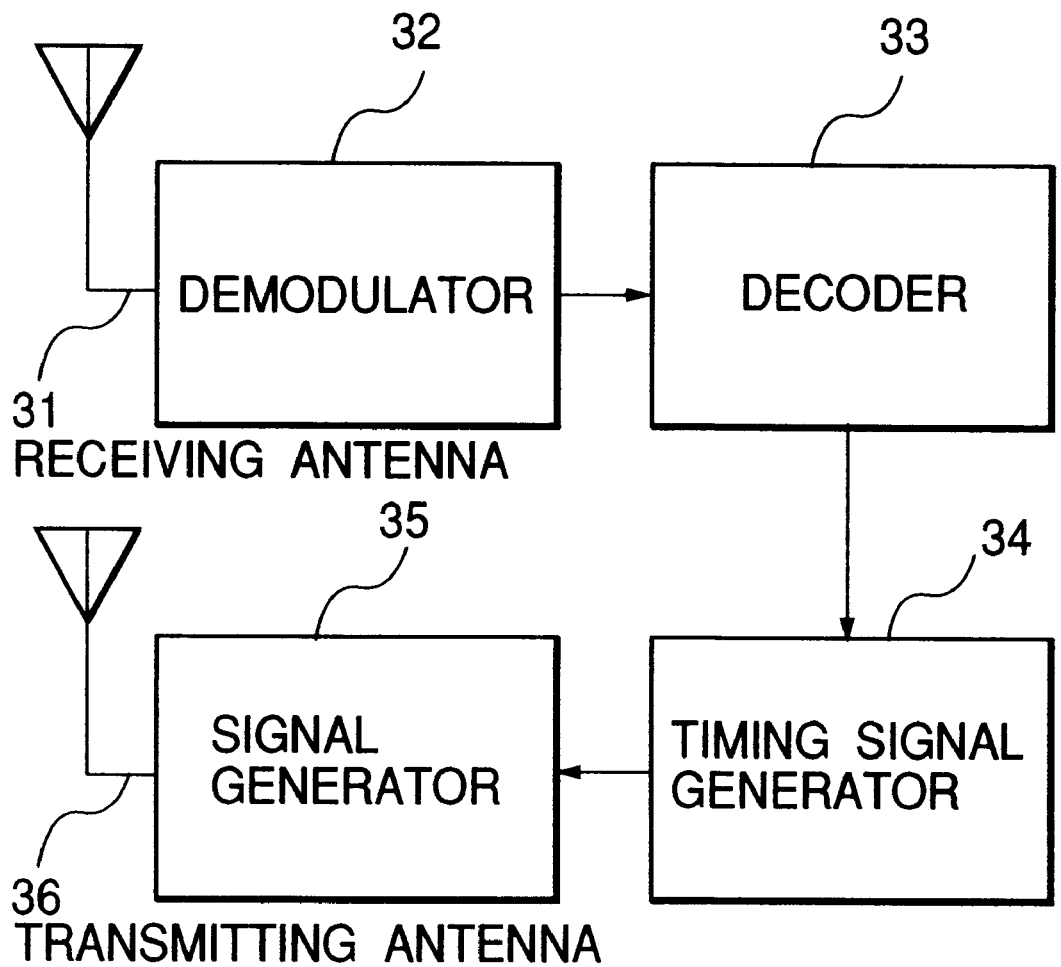
FIG. 3 illustrates a preferred example of a construction of the function control signal transmitter as shown in FIG. 1.

In FIG. 3, the call signal 4 from the base station 1 is received by a demodulator 32 of the function control signal transmitting device 2 through an antenna 31. The call signal 4 is amplified and demodulated by the demodulator 32. The call signal amplified and demodulated by the demodulator 32 is wave-shaped and a resultant digital signal is input to a decoder 33. The decoder 33 decodes the input digital signal. Further, the decoder 33 detects a frame start position of the call signal 4 and inputs the frame start position to a timing signal generator 34. The timing generator 34 generates a timing signal in only a specific period of the frame in synchronism with the frame start position. In response to the timing signal, a signal generator 35 generates the function control signal 5 having the same frequency as that of the call signal 4 only when the timing signal is generated and transmits the function control signal through a transmission antenna 36. Thus, the function control signal 5 is transmitted in only a portion of the period of the call signal 4. Details thereof will be described later in more detail.

The signal format of the call signal 4, which is used in the radio selective call receiver 7 of the present invention, will be described with reference to FIG. 4.

Figure 4:
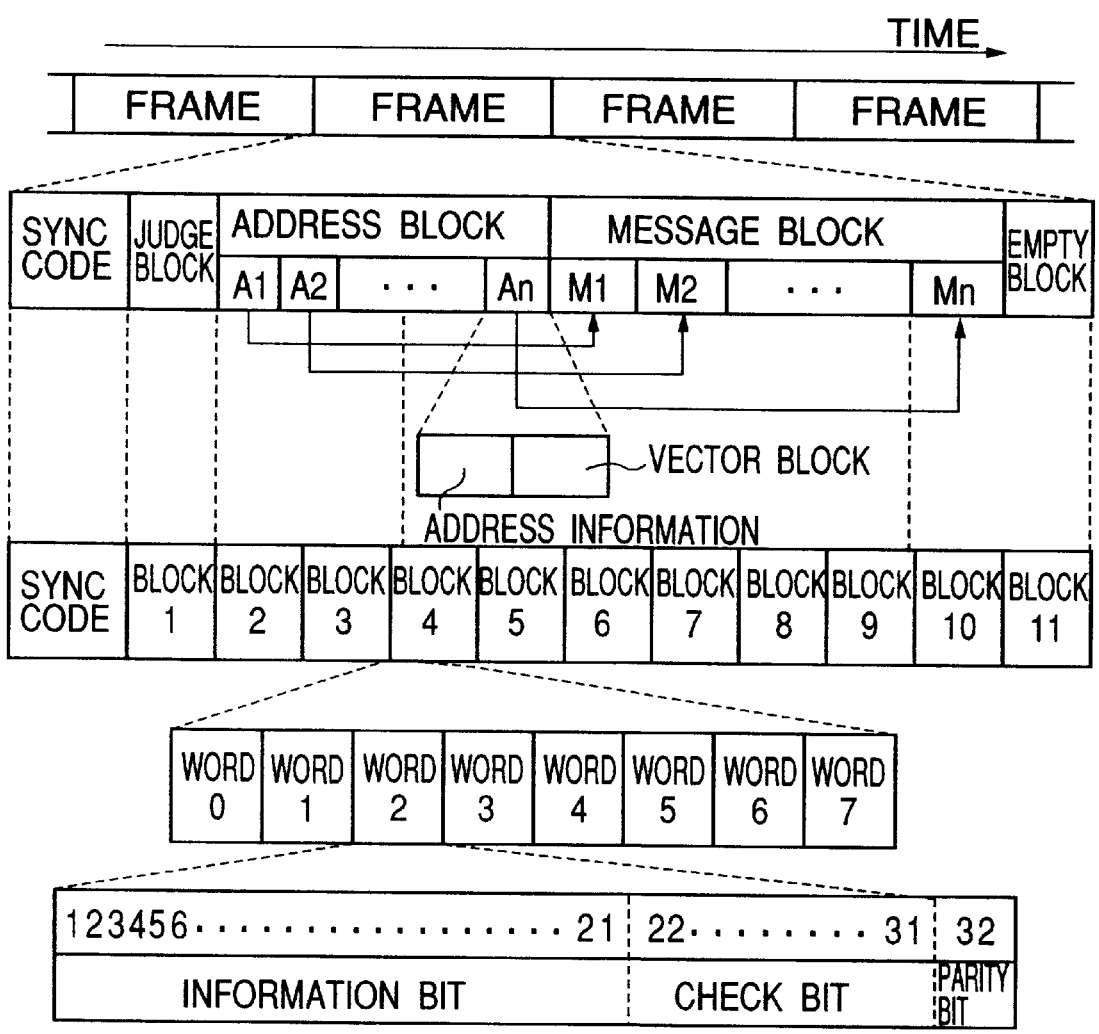
FIG. 4 illustrates a preferred example of a call signal format used in the radio selective call receiver as shown in FIG. 1.

In FIG. 4, the call signal 4 is transmitted from the base station 1 in frame unit having a specific length in synchronism with the call signal 4.

A sync code is arranged in a head of each frame of the call signal. In the remaining area of each frame, a judge block, an address block (A1, A2, . . . , An), a message block (M1, M2, . . . , Mn) and an empty block are arranged in the order. These four blocks will be referred to as logic blocks. The sync code is used to synchronize a receiving of frames by the radio selective call receiver 7. The judge block is provided to determine whether or not the radio selective call receiver 7 exists in the function control area 3 and an arbitrary data may be arranged in this block. However, the data to be arranged in the judge block should be a data string in which no error occurs in an error correction processing to be described later. In the address block, the address information of the radio selective call receiver which are to be called and vector blocks are stored. The vector block indicates an information as to physical block numbers to be described later in which an message information paired with the called address information are arranged, respectively, and an information as to a position in the message block at which an message information is to be started. The message block stores the message information. The empty block is provided when a sum of the sync code, the judge block, the address block and the message block is smaller than 1 frame length.

The area other than the sync code is physically divided to 11 blocks which are referred to as the physical blocks. Although the judge block of the logic blocks corresponds in time to a first physical block, the respective remaining logic blocks not always correspond in time to the second to eleventh physical blocks, respectively.

Each physical block is constructed with data of 8 words where 1 word is a bit string of 32 bits long including 21 information bits, 10 check bits and 1 parity bit. The information bits contain a call number of the radio selective call receiver, a message from a caller such as telephone number and other information. The check bits are used to correct error to be generated, for example, when the receiving condition is not suitable. The parity bit is used to judge whether any bit of the information is dropped out or any bit is added thereto.

The respective information bits are error-correction-coded by using the check bits such that error of up to 2 bits can be corrected in word unit.

Data transmission of each physical block is performed by interleave processing. That is, data is transmitted in the order of the first bit of the word 1, the second bit of the word 2, the third bit of the word 3 and so on. This interleave processing provides an effect of dispersing successive data errors. With the error correction processing performed in word unit, it is possible to improve the possibility of correction of erroneous data to correct data. Therefore, the information data of the respective logic blocks is partitioned every 21 bits and, after error-correction-coded, constructed as a word. Further, the information data of the respective logic blocks are interleaved in physical block unit and transmitted every bit in the interleaved sequence.

A timing of the call signal 4 received by the radio selective call receiver 7 of the present invention and the function control signal 5 transmitted from the function control signal transmitting device 2 will be described with reference to FIG. 5.

Figure 5:
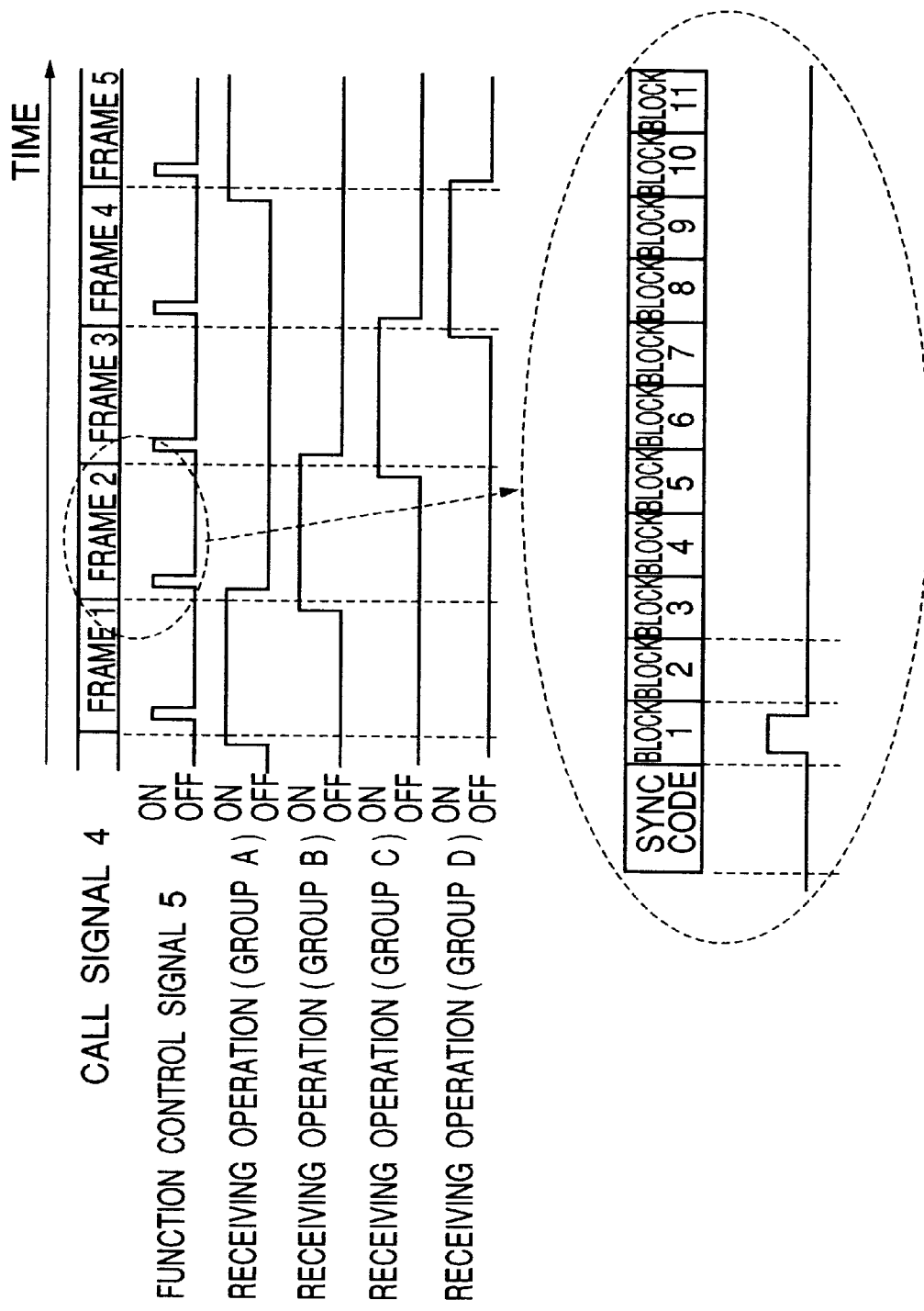
FIG. 5 illustrates a preferred example of a timing of the call signal as shown in FIG. 4 and a function control signal.

In FIG. 5, it is assumed that a plurality of the radio selective call receivers are divided to groups A to D, for example. The radio selective call receivers in each group receive only a specific frame of the call signal 4 assigned to the same group. That is, the radio selective call receivers in group A receive only frame 1 of the call signal 4, those in group B receive only frame 2, those in group C receive only frame 3 and those in group D receive only frame 4. Thus, the respective radio selective call receivers perform their receiving operation every 4 frames. Therefore, compared to a generation of a call at a random time, there may be a slight time delay until the call practically transmits as the call signal 4. However, comparing with the case where the radio selective call receiver always receives all address block, a prolongation of lift time of a battery as a power source of the radio selective call receiver can be expected.

In a case where there is no address assigned to a radio selective call receiver in the address block, the receiving operation of the same radio selective call receiver is terminated at the time without receiving a next block, that is, the message block.

On the other hand, when there is the address assigned thereto in the address block, the receiving operation of the radio selective call receiver is temporarily stopped at an end of the address block and, thereafter, is restarted in a block containing a message information on the basis of the information stored in the vector block of the address thereof. The receiving operation of the radio selective call receiver is terminated with termination of the message information. Therefore, comparing with the case where the radio selective call receiver always receives all of the message block, a prolongation of lift time of a battery as a power source of the radio selective call receiver can be expected. However, the radio selective call receiver of the present invention has to receive at least the sync code, the first block which is the judge block and the second block with which the address block is started.

The function control signal 5 is transmitted in only time periods during which the judge blocks of the respective frames of the call signal 4, that is, the first blocks of the physical block, are transmitted. Therefore, since an interference occurs during a receiving of the first block in the function control area 2, the possibility that the respective words in the first block become word error, that is, the error correction processing becomes impossible becomes very high.

An operation of the radio selective call receiver 7 of the present invention will be described in detail with reference to FIGS. 6 and 7.

Figure 6:
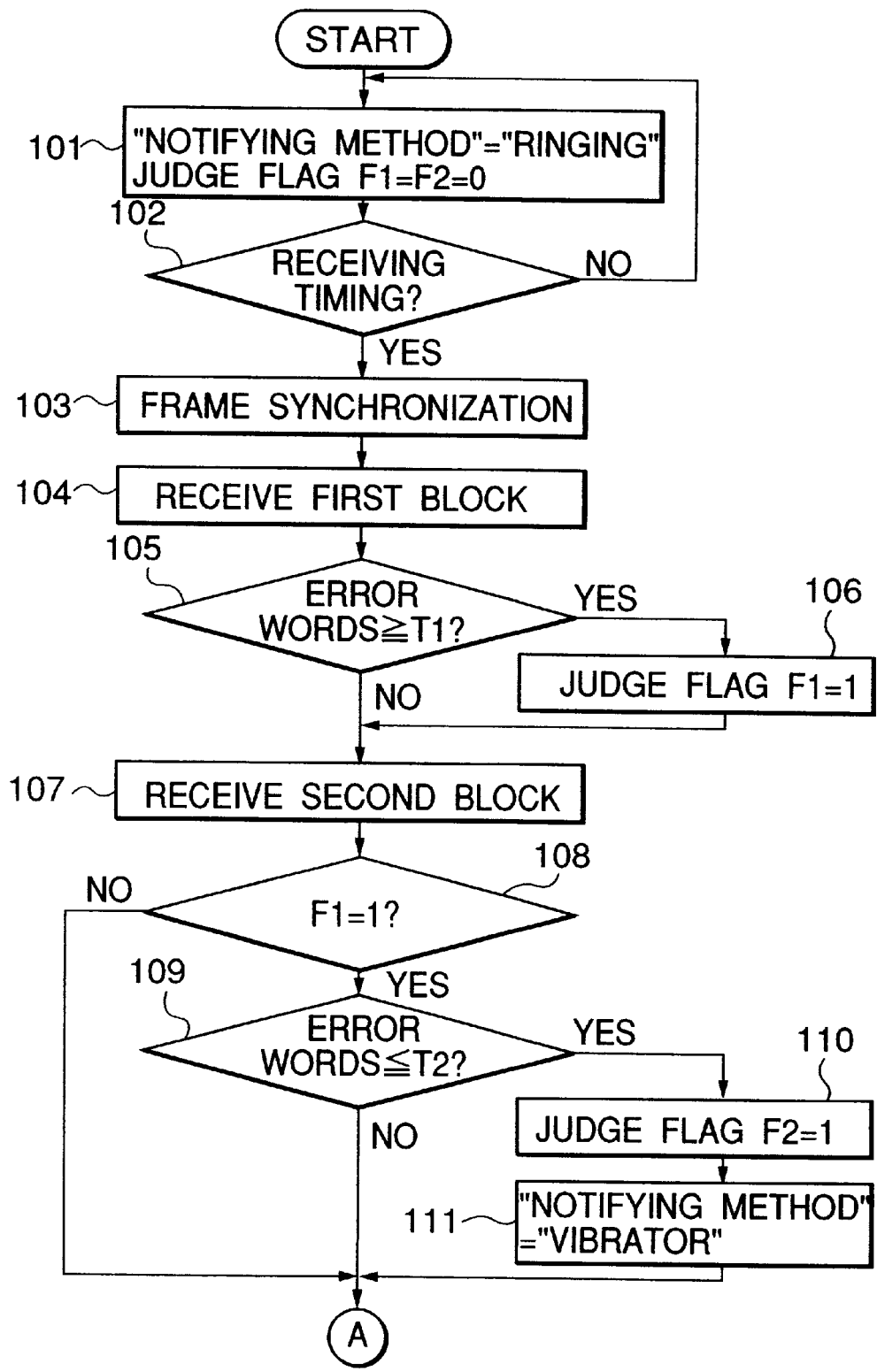
FIGS. 6 and 7 illustrate a flowchart for explaining a preferred example of operation of the radio selective call receiver as shown in FIG. 1.

In FIG. 6, the radio selective call receiver 7 of the present invention is controlled by the function control signal 5 transmitted by the function control signal transmitting device 2 such that it usually notifies a call by the loudspeaker 19 and, when it is within the function control area 3, notifies the call by the vibrator 18.

As an initial setting, a variable "call notifying method" is set to "loudspeaker" and judge flags F1 and F2 are set to 0, respectively (step 101).

Then, it is determined whether or not the timing of a frame of the call signal 4 from the base station 1 is one to be received by a certain radio selective call receiver (step 102). When the frame is to be received by the radio selective call receiver (YES in the step 102), the frame synchronizing operation is performed by the sync code (step 103). On the other hand, when the frame is not to be received by the radio selective call receiver (NO in the step 102), the operation is returned to the step 101 to perform the initial setting.

After the frame synchronization is achieved, the judge block, that is, the first block, is received (step 104). In this case, word errors occurred in the first block are counted. After the counting of the word errors is completed, it is determined whether or not the number of error words is equal to or larger than a predetermined value T1 (step 105). When the number of the error words is equal to or larger than the predetermined value T1 (YES in the step 105), "1" is set in the judge flag F1 (step 106). The predetermined value T1 is a value for judging that there are the number of error words of which is substantially large compared with a total number of words in one block and it is preferable to preliminarily set the value T1 to, for example, 6 to 7 since one block is constructed with 8 words.

When it is determined in the step 105 that the number of error words is smaller than the predetermined value T1 (NO in the step 105) and "1" is set in the judge flag F1 in the step 106, the start block of the address block, that is, the second block, is received (step 107).

When the occurrence number of word errors in the first block is equal to or larger than T1, that is, the flag F1 is set "1" (YES in the step 108), word errors in the second block are counted. After the counting of the word errors in the second block, it is determined whether or not the count of word errors in the second block is equal to or smaller than a predetermined value T2 (step 109). When the occurrence number of word errors in the second block is equal to or larger than the predetermined value T2 (YES in the step 109), the judge flag F2 is set "1" (step 110). The predetermined value T2 is a value for judging that there are the number of error words of which is substantially small compared with the total number of words in one block and it is preferable to preliminarily set the value T2 to, for example, 2 to 3 since one block is constructed with 8 words.

The judge flags F1 and F2 are "1" so long as the data error in the first block is substantially large and that in the second block is substantially small. Further, since the frame receiving operation of the radio selective call receiver is synchronized by the sync code before it receives the first block, that is, the judge block of the frame, data error in the sync code is small. The phenomenon that the data error is substantially large in only the first block and the data error in the blocks preceding and succeeding to the first block, that is, the sync code and the second block, is substantially small is hardly thought as a natural phenomenon. Therefore, it is possible to consider that an interference occurs intentionally in the only first block. That is, it can be thought that the judge flags F1 and F2 become "1", respectively, only when the radio selective call receiver 7 exists in the function control area 3. When the judge flags F1 and F2 are 1, the variable "call notifying method" is set to "vibrator" (step 111) and the call notifying by the loud speaker 19 is not performed.

Figure 7:
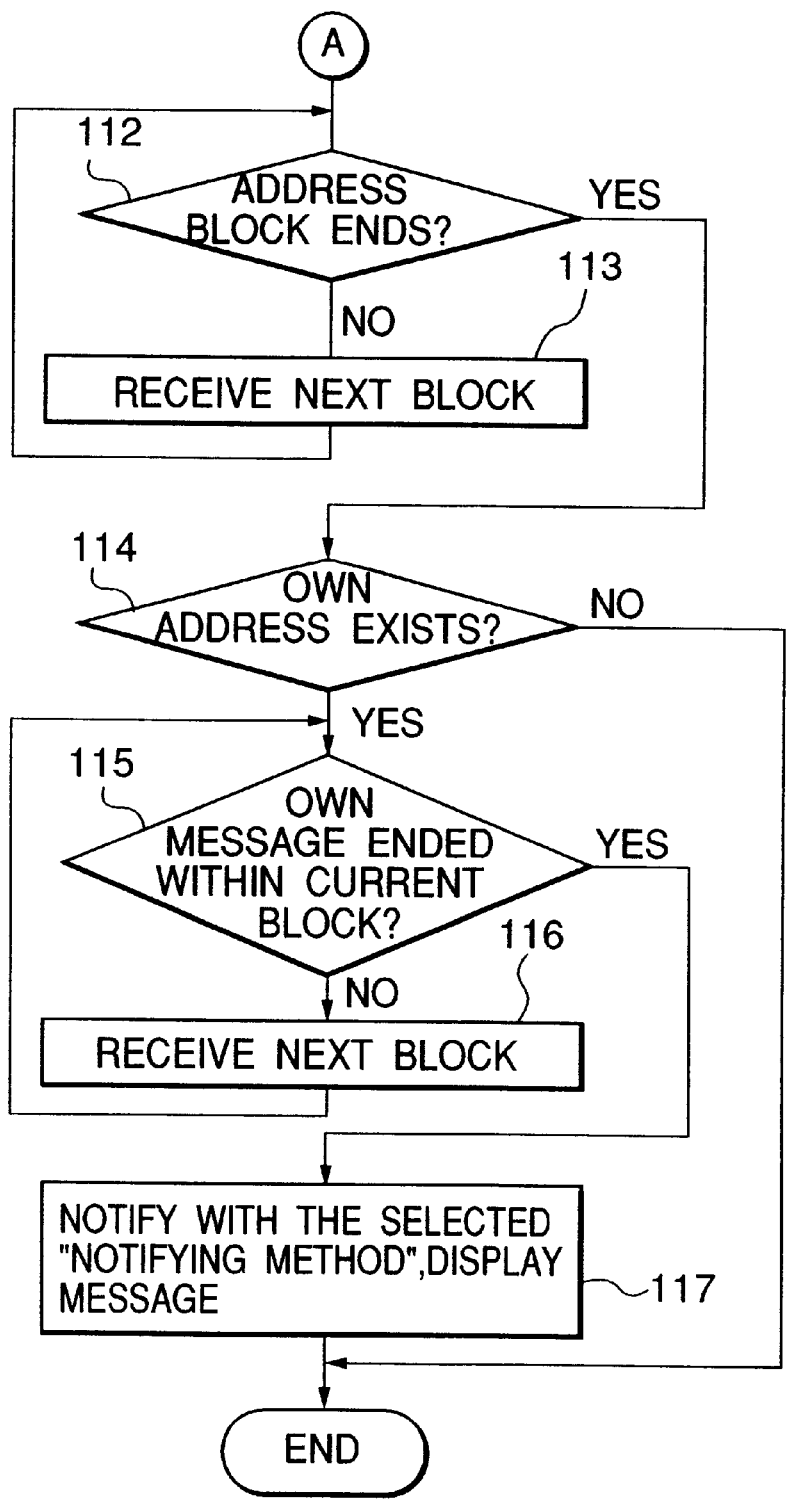

When it is determined in the step 108 that the judge flag F1 is not 1, when it is determined in the step 109 that the number of error words in the second block is larger than the predetermined value T2 and when the variable "call notifying method" is set to "vibrator" in the step 111, it is determined in the second block whether or not the receiving of the address block is completed (FIG. 7, step 112). When it is determined that the receiving of the address block is not completed (NO in the step 112), the next block is received (step 113) and then it is determined again whether or not the receiving of the address block is completed (step 112). The processing of the steps 112 and 113 are repeated until a block whose address block is completed is received.

When the receiving of the all address blocks is completed (YES in the step 112), it is determined whether or not there is an address in the received address block, which coincides with the address of the radio selective call receiver (step 114).

When it is determined that there is no address in the received address block which coincides with the address of the radio selective call receiver (NO in the step 114), the call notifying is not performed and the receiver becomes in a waiting state.

On the other hand, When it is determined that there is the address in the received address block which coincides with the address of the radio selective call receiver (YES in the step 114), the block number stored a message information paired with the address block is received on the basis of the vector block in the same address block. Thereafter, it is determined in the received block whether or not the message is completed (step 115). When it is determined that the message is not completed (NO in the step 115), the next block is received (step 116) and it is determined again whether or not the message is completed (step 115). The steps 115 and 116 are repeated until the block in which the message is completed is received.

When it is determined that the message is completed (YES in the step 115), the message received is displayed on the display portion 21 and the call notifying is performed by either the loud-speaker 19 or the vibrator 18 on the basis of the content of the variable "call notifying method". After the call notifying, the receiver becomes the waiting state again.

Incidentally, it is not always necessary to initially select the loud-speaker 19 as the ringing means. It is preferable that a user can arbitrarily set the notifying method. However, it is important that any audible notifying is not used in the prohibited area regardless of the notifying setting.

Now, a relation between a radio communication device according to another embodiment of the present invention, preferably, a bi-directional radio selective call receiver such as a two-way pager, and the function control signal transmitting device will be described with reference to FIG. 8.

Figure 8:
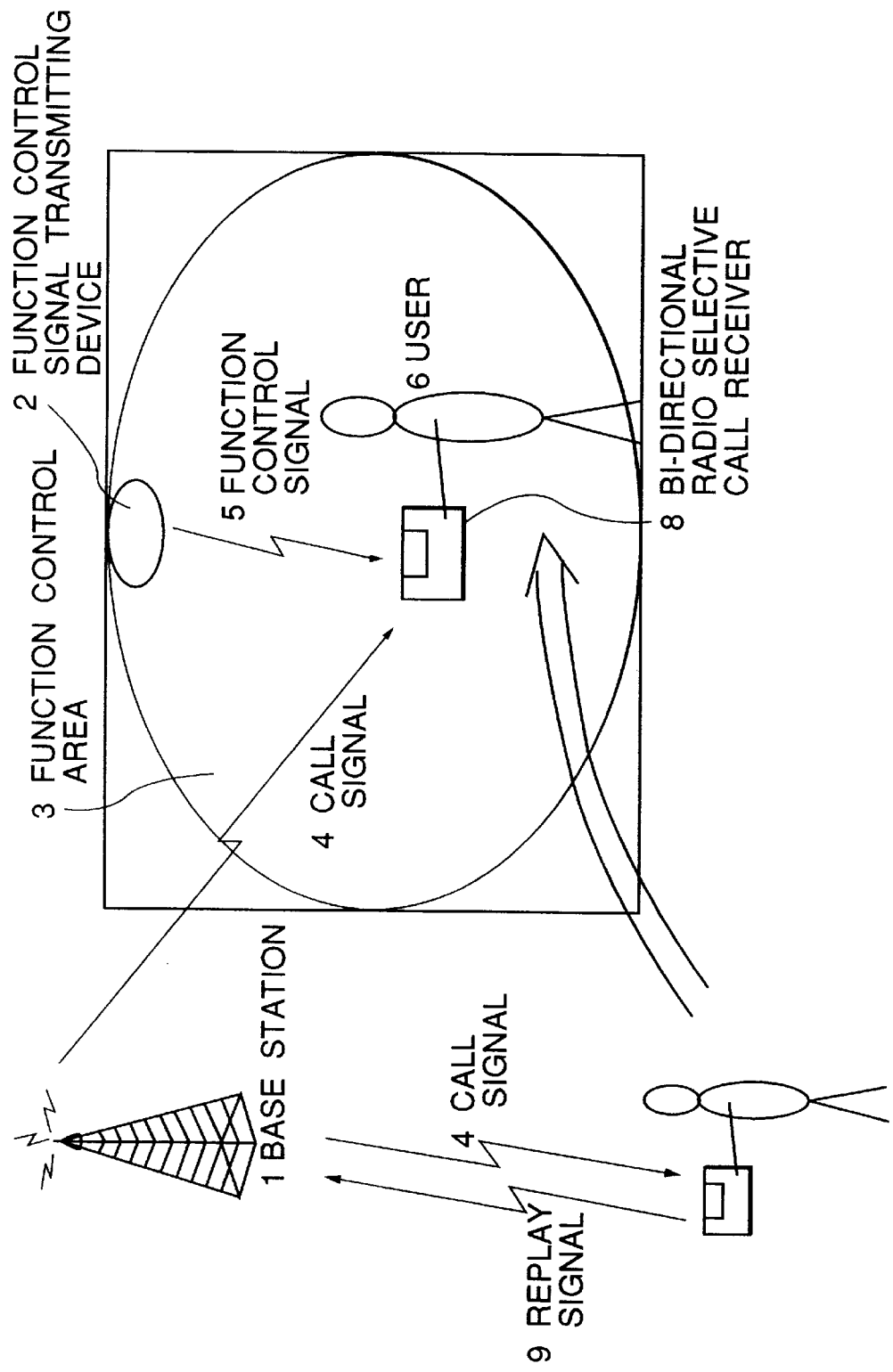
FIG. 8 illustrates a relation between a function control signal transmitter and a bi-directional radio selective call receiver according to another preferred embodiment of the present invention.

In FIG. 8, the same components of the radio selective call receiver and the function control signal transmitting device as those shown in FIG. 1 are depicted by the same reference numerals, respectively. The bi-directional radio selective call receiver 8 of the present invention has a function that, when it receives a message information directed thereto through a call signal 4, it automatically transmits a message information to a base station 1 as a reply signal 9.

A circuit construction of the bi-directional radio selective call receiver 8 of the present invention will be described with reference to FIG. 9.

Figure 9:
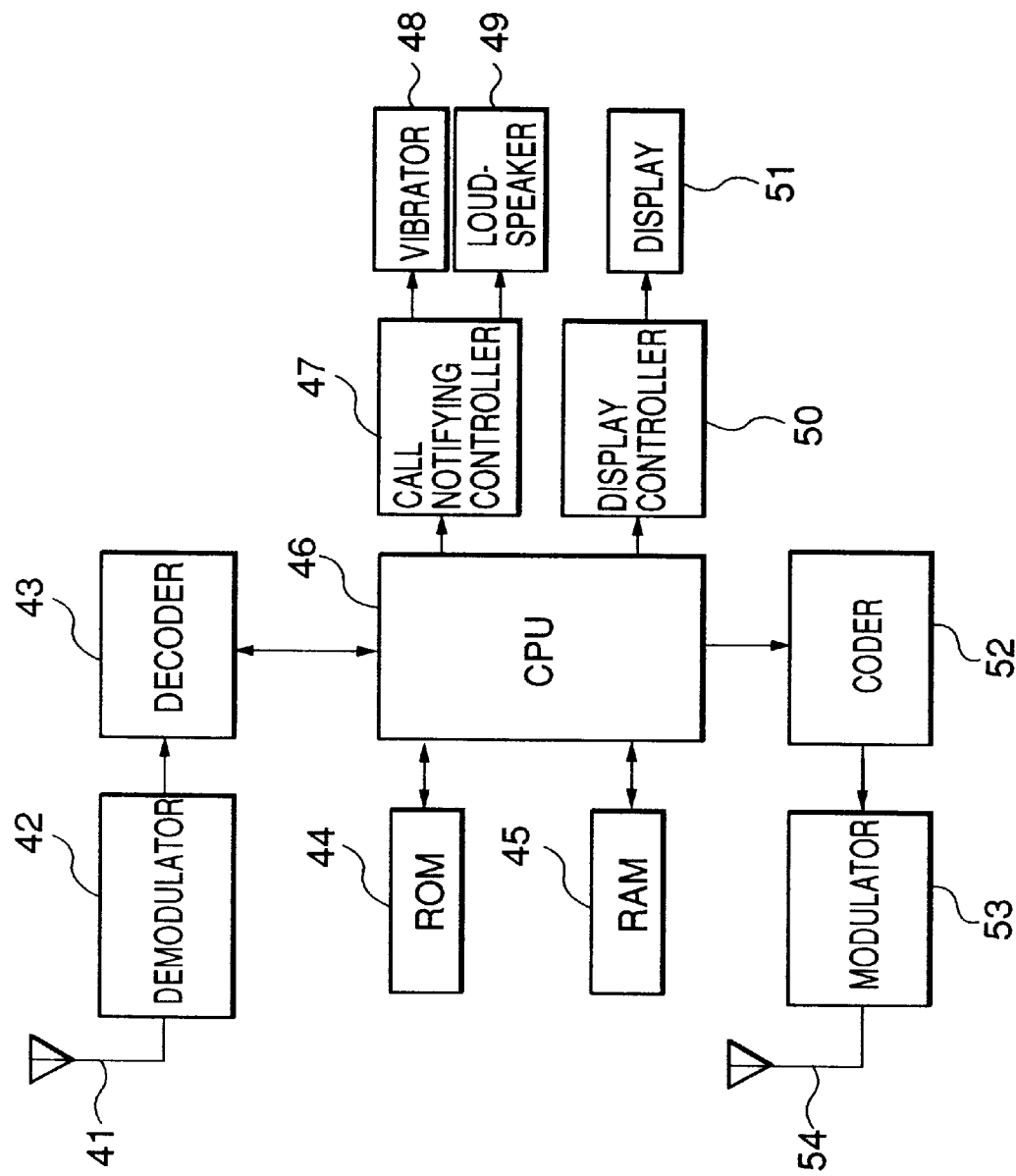
FIG. 9 illustrates a preferred example of a construction of the bi-directional radio selective call receiver as shown in FIG. 8.

In FIG. 9, functions of constructive components 41 to 51 of a receiving system are substantially the same as those of the constructive components 11 to 21 of the radio selective call receiver 7 as shown in FIG. 7 and, in order to avoid redundancy of description, details thereof are omitted. Here, functions of constructive components 52 to 54 of a transmitting system will be described.

The bi-directional radio selective call receiver 8 of the present invention includes, in addition to the constructive components of the radio selective call receiver 7 as shown in FIG. 2, a coding portion 52, a converter portion 53 and a transmitting antenna 54. The coding portion 52 is adapted to code data sent from a CPU 46. The converter portion 53 modulates a digital signal from the coding portion 52 with a predetermined frequency of the reply signal. The transmitting antenna 54 transmits the modulated reply signal 9.

The circuit construction of the function control signal transmitting device 2 of the present invention is the same as that shown in FIG. 3 and, in order to avoid redundancy of description, details thereof are omitted. Further, the signal format of the call signal 4 used for the bi-directional radio selective receiver 8 of the present invention and the timing of the call signal 4 and the function control signal 5 are also the same as those shown in FIGS. 4 and 5. Therefore, in order to avoid redundancy of description, their details are omitted.

An operation of the bi-directional radio selective call receiver 8 of the present invention will be described with reference to FIG. 10.

Figure 10:
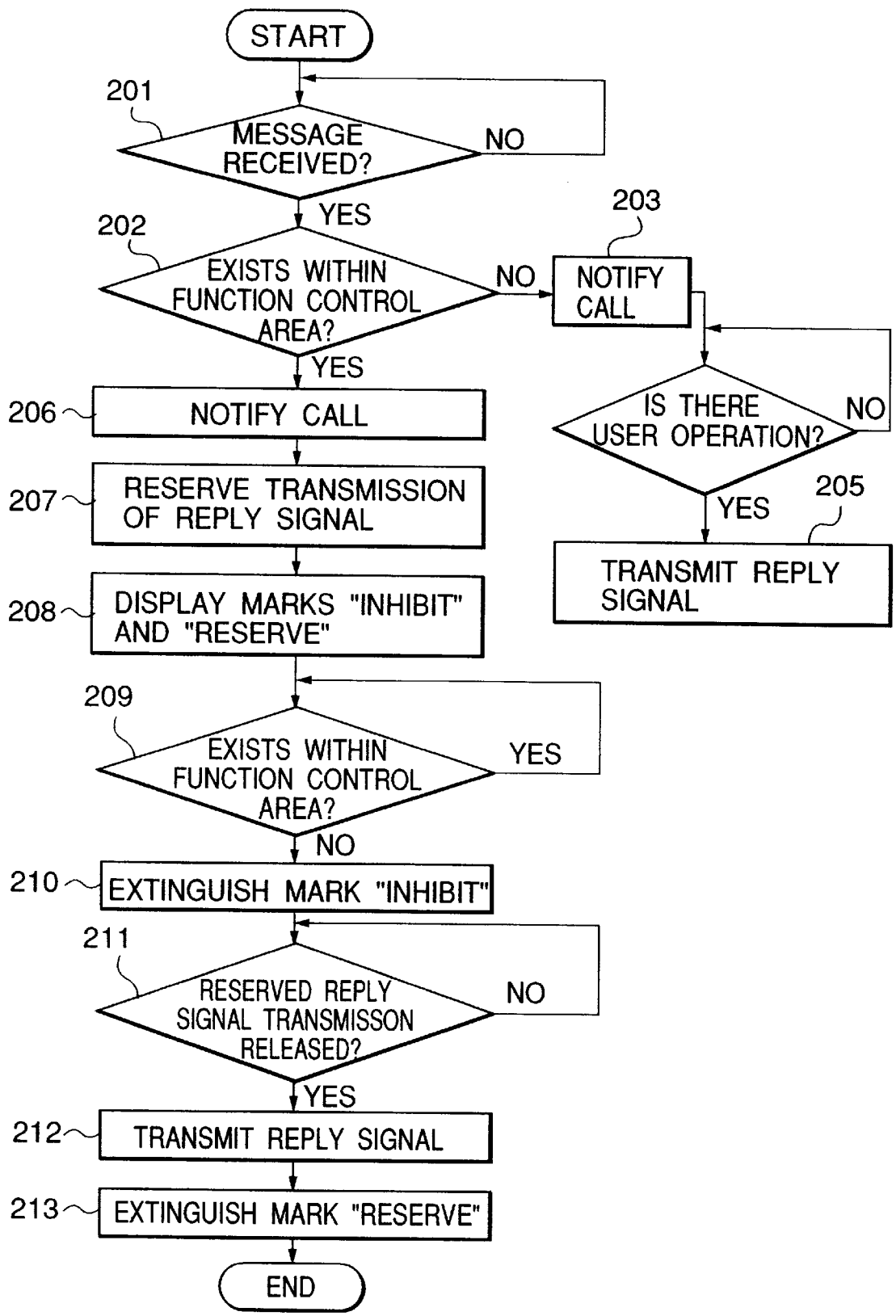
FIG. 10 illustrates a flowchart for explaining a preferred example of operation of the bi-directional radio selective call receiver as shown in FIG. 8.

In FIG. 10, when the bi-directional radio selective call receiver 8 of the present invention receives a message information designated thereto (YES in step 201), it is determined whether or not the bi-directional radio selective call receiver 8 exists in a function control area 3 (step 202). Incidentally, the step 201 corresponds to the steps 101 and 102 shown in FIG. 6 and the step 202 corresponds to the steps 103 to 111 as shown in FIG. 6.

When it is determined that the bi-directional radio selective call receiver 8 exists out of the function control area 3 (NO in the step 202), the call is notified by either the loud-speaker 19 or the vibrator 18 according to a content of the variable "call notifying method" in the step 202 (step 203). When a user is aware of the call notifying and operates an external switch, etc., which is not shown (YES in step 204), the bi-directional radio selective call receiver 8 transmits a reply signal 9 to the base station 1 (step 205). The call notifying is continued until the external switch, etc., which is not shown, is operated by the user (NO in the step 204).

Figure 11:
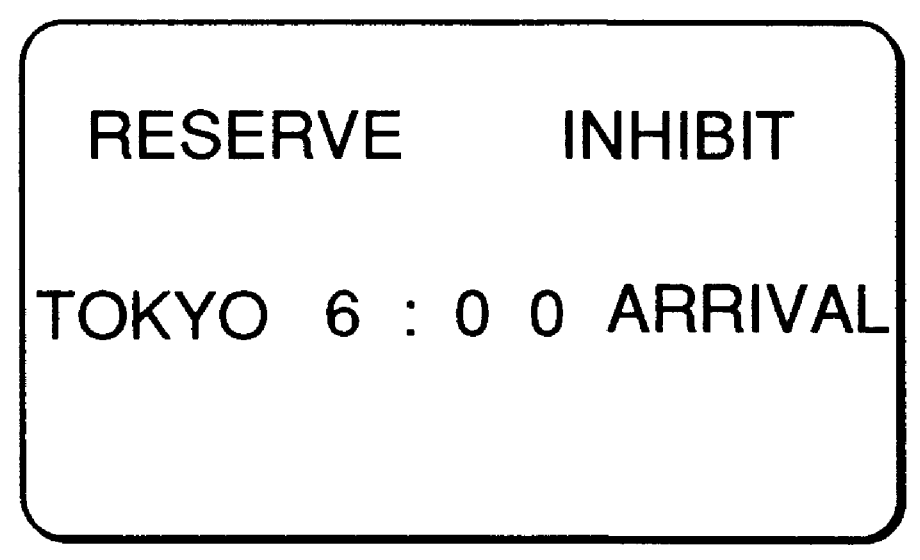

On the other hand, when it is determined that the bi-directional radio selective call receiver 8 exists in the function control area 3 (YES in the step 202), the call is notified by either the loud-speaker 19 or the vibrator 18 according to a content of the variable "call notifying method" in the step 202 (step 206). Thereafter, the transmission of the reply signal 9 is reserved (step 207). Further, a mark "inhibit" indicative of the existence of the bi-directional radio selective call receiver 8 in the function control area 3 and a mark "reserve" indicative of the reservation of transmission of the reply signal 9 are displayed on the display portion 51 (step 208). FIG. 11 illustrates an example of the display on the display portion 51 in the step 208.

When the user 6 moves out from the function control area after the user confirms the content of the display portion 51 as shown in FIG. 11 (NO in the step 209), the mark "inhibit" is extinguished (step 210). when the user 6 confirms the extinction of the mark "inhibit" and operates the external switch, etc., which is not shown (step 211), the reply signal 9 which is reserved is transmitted (step 212). Thereafter, the mark "reserve" indicative of the reservation of transmission of the reply signal 9 is extinguished (step 213).

When the user 6 does not move out from the function control area 3 (YES in the step 209), the marks "inhibit" and "reserve" are left lit on the display portion 51.

The function control signal 5 transmitted by the function control signal transmitting device 2 is set such that it influences the receiving of the call signal 4 of the bi-directional radio selective call receiver 8 in only a limited area in the vicinity of the function control signal transmitting device 2. Therefore, the intensity of the function control signal 5 transmitted by the function control signal transmitting device 2 is low compared with that of the reply signal 9. For example, by setting the function control signal transmitting device 2 in the vicinity of devices such as electronic medical devices which are sensitive to electromagnetic wave noise, the transmission of the reply signal 9, which may influence such devices, from the bi-directional radio selective call receiver 8 can be restricted in the vicinity of them.

Further, the bi-directional radio selective call receiver 8 of the present invention transmits the reply signal 9 to the call signal 4 from the base station 1 by some operation by the user 6 after the call is notified. However, the transmission of the reply signal 9 to the call signal 4 may be performed automatically. In such case, the bi-directional radio selective call receiver 8 operates through the steps except the steps 203, 204 and 211 shown in FIG. 10.

The signal format of the call signal 4 according to another embodiment of the present invention and the timing of the call signal 4 and the function control signal 5 will be described with reference to FIG. 12.

A relation between the radio communication device, preferably a radio selective call receiver 7 such as a pager, and a function control signal transmitting device 2 is the same as that shown in FIG. 1 and, in order to avoid redundancy of description, details thereof are omitted.

Further, the circuit construction of the function control signal transmitting device 2 and the radio selective call receiver 7 of the present invention are the same as those shown in FIGS. 2 and 3 and, in order to avoid redundancy of description, details thereof are omitted.

Figure 12:
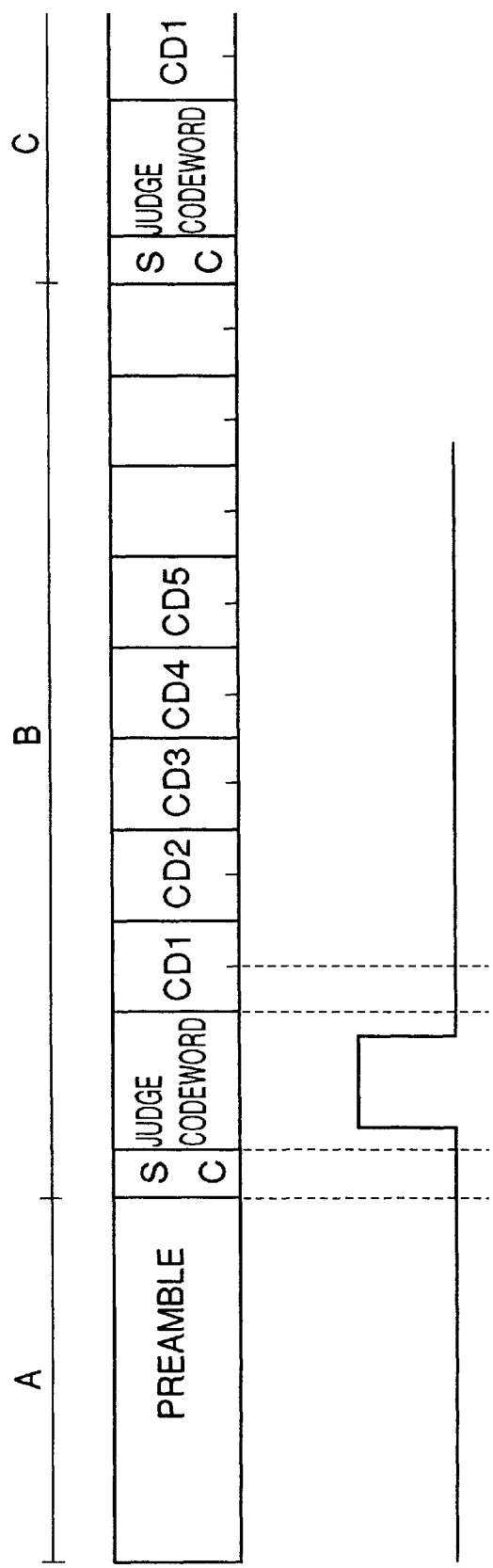
FIG. 12 illustrates a preferred signal format of a call signal used in the radio selective call receiver as shown in FIG. 1 and a preffered example of a timing of the call signal and a function control signal.

In FIG. 12, the call signal 4 used in the radio selective call receiver 7 of the present invention employs the POCSAG (Post Office Code Standardization Advisory Group) system. In the POCSAG system, the call signal 4 is constructed with a preamble signal A composed of 576 bits arranged sequentially in the order of 101010 . . . and a plurality of subsequent batch signals B, C, . . . .

The preamble signal A is a signal for the radio selective call receiver to confirm a start of data transmission and to synchronize with the transmission.

Each of the batch signals B, C, . . . is composed of a sync codeword SC and eight frames CD1 to CD8 each being constructed with 2 codewords. The sync codeword SC and one codeword are composed of 32 bits, respectively. One of the codewords of each frame is an address codeword indicative of a call number or a message codeword indicative of a message.

In the POCSAG system, a power source of the radio selective call receiver is turned on not always but only when required. That is, the frames CD1 to CD8 of one batch are preliminarily assigned to the respective radio selective call receivers and each radio selective call receiver turns its own power source on when it receives the assigned one frame. The sync codeword SC is used to detect a position of the frame assigned to the radio selective call receiver.

Therefore, the radio selective call receiver turns its power source on for an only time period of the sync codeword SC and one frame assigned thereto. When the radio selective call receiver determines that the received one frame is its own address information, the radio selective call receiver also receives the next message codeword and takes data thereof in. Therefore, according to the radio selective call receiver of the present invention in which the POCSAG system is employed, it is possible to reduce the power consumption. However, since the whole system is not synchronized when the power source of the radio selective call receiver is turned on, the preamble signal A is detected by periodically turning the power source on.

The call signal 4 of the present invention includes a judge codeword of 32 bits between the sync codeword SC and the first frame CD1. The judge codeword corresponds to the judge block as shown in FIG. 4. The function control signal 5 is transmitted only when the judge codewords of the respective batches of the call signal 4 are being transmitted. That is, the radio selective call receiver of the present invention determines whether or not it exists in the function control area 3 by using the sync codeword SC, the judge codeword and the first codeword of the first frame CD1.

An operation of the radio selective call receiver of the present invention will be described with reference to FIG. 13.

Figure 13:
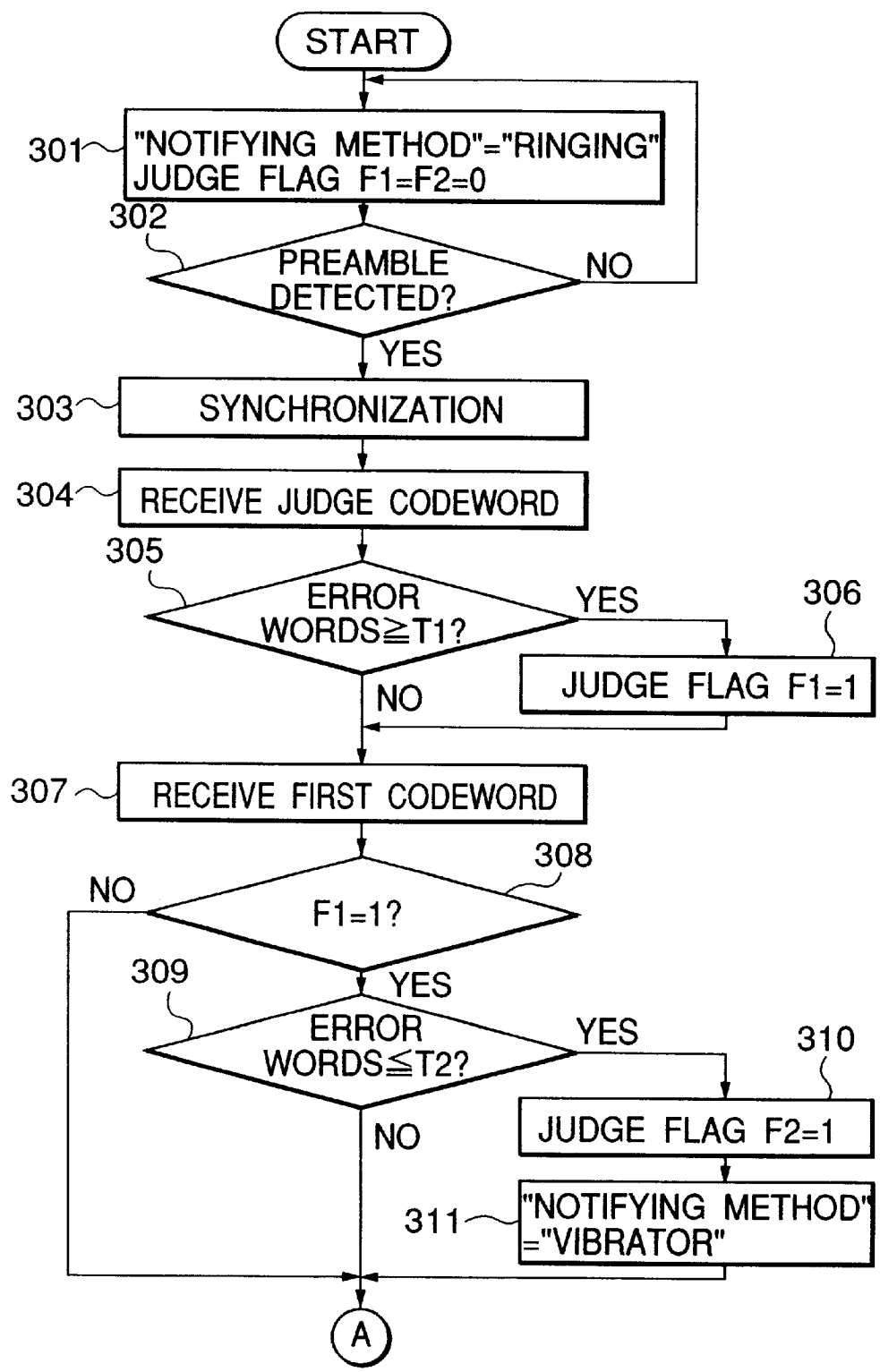
FIGS. 13 and 14 illustrate a flowchart for explaining a preferred example of operation of a radio selective call receiver using the signal as shown in FIG. 12.
Figure 14:
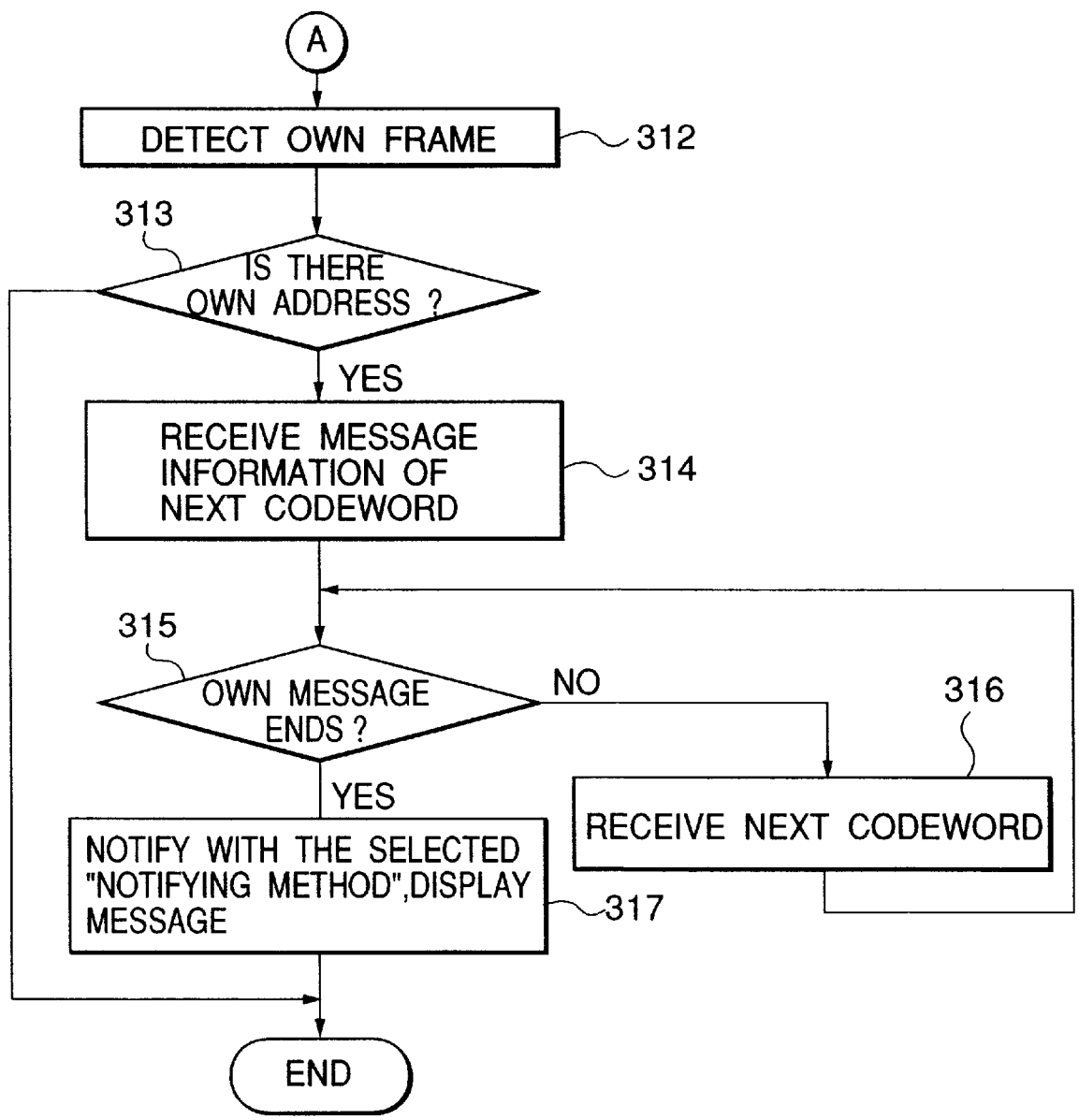

In FIG. 13, the radio selective call receiver 7 of the present invention is controlled such that it usually notifies a call by a loud-speaker 19 and, when it exists in the function control area 3, by a vibrator 18.

As an initial setting, a variable "call notifying method" is set to "loud-speaker" and judge flags F1 and F2 are set to "0", respectively (step 301).

Then, it is determined whether or not the preamble of a frame of the call signal 4 from the base station 1 is detected (step 302). When it is determined that the preamble is detected, the frame synchronization is performed (step 303). On the other hand, when it is determined that no preamble is detected, the operation is returned to the step 101 to perform the initial setting (step 301).

The processing in steps 304 to 311 is the same as that in the steps 104 to 111 shown in FIG. 6 and, in order to avoid redundancy of description, details thereof are omitted. However, in the step 304, the judge codeword is received while, in the step 307, the first codeword of the first frame CD1.

When it is determined in the step 308 that the judge flag F1 is not 1, it is determined in the step 309 that the number of error words in the first codeword of the first frame CD1 is larger than a predetermined value T2 and the variable "call notifying method" is set to "vibrator" in the step 311, the radio selective call receiver 7 detects a frame assigned thereto (step 312). Thereafter, it is determined whether or not there is an address in the detected frame, which coincides with the address of the receiver (step 313).

When it is determined that there is no address in the frame which coincides with the address of the receiver (NO in the step 313), the receiver becomes in the waiting state again (step 301). On the other hand, when it is determined that there is the address which coincides with the address of the receiver (YES in the step 313), the radio selective call receiver receives a message information subsequent to the address which coincides with that of the receiver (step 314). Thereafter, it is determined whether or not the message is terminated within the codeword which is being received currently (step 315).

When it is determined in the step 315 that the message is not terminated in the currently receiving codeword (NO in the step 315), the radio selective call receiver receives the next codeword (step 316) and it is determined again whether or not the message is terminated (step 315). The processing in the steps 315 and 316 is repeated until a codeword in which the message is terminated is received.

When it is determined that the message is terminated (YES in the step 315), the message received is displayed on the display portion 21. Further, the call notifying is performed by the loud-speaker 19 or the vibrator 18 according to the content of the variable "call notifying method" (step 317). After the call notifying, the receiver becomes in the waiting state again.

Although, in the above mentioned embodiment, the receiver determines whether or not it is within the function control area on the basis of the call signal divided to the physical blocks, it may be possible to determine whether or not the receiver is within the function control area according to the call signal divided to the logic blocks. In such case, it is preferable to count word errors in the same number of words as that of the judge block, started from the head of the address block.

The number of words of each of the physical blocks of the call signal is arbitrary. However, it is necessary to change the predetermined values T1 and T2 for determining the significance of error words, correspondingly to the number of words of each block.

Then in the above mentioned embodiment, the radio selective call receiver determines whether or not it exists in the function control area by using the first codeword of the first frame CD1. However, it may be possible to determine whether or not the receiver is within the function control area by using the first codeword of the own frame. In such case, it may be possible to reduce in determination with the high exactitude, but it is possible to reduce the power consumption more.

Further, in the above mentioned embodiment, as the call notifying method, the loud-speaker is used out of the function control area and the vibrator is used in the function control area. However, the call notifying method is not limited thereto. That is, it may be possible to make the call notifying method selectable by the user operation of an external switch, etc., out of the function control area and the call may be notified by other call notifying method such as vibrator, LED or LCD in the function control area. On the other hand, it may be possible that a user can preliminarily set the call notifying method in the function control area.

Although, in the above mentioned embodiment, the radio selective call receiver has been described as the radio communication device, the radio communication device of the present invention can be applied to a portable telephone set. However, since the portable telephone set is not provided with a function of storing a received message information, it should be modified such that, when the portable telephone set is called in the function control area, it can perform an automatic response thereto such as response reservation, absence response or call transfer. The response reservation is a function of reserving a response to a call in the function control area and enabling a response to the call when the portable telephone set moves out from the function control area. The absence response is a function of recording a message from a sender in response to a call in the function control area. The call transfer is a function of transferring a call message in the function control area to a predetermined designation.

Further, although, in this embodiment, the radio communication device including the radio selective call receiver whose function is restricted has been described, the present invention is not limited to such kind of radio communication device. Therefore, the present invention can be applied to any radio communication device whose the function is to be restricted.

As described, according to the present invention, the function of the radio communication device is controlled by locating the function control signal transmitting device in a place in which the use of the radio communication device is to be restricted and intentionally interfering the call signal from the base station with the function control signal from the function control signal transmitting device and having the same frequency as that of the call signal. Therefore, the radio communication device according to the present invention makes a user of the radio communication device located in the specific area impossible to communicate the other and to trouble others in that area.

Further, since the function control signal has the same frequency as that of the call signal from the base station, there is no need of adding an extra circuit construction such as a receiving portion and an antenna for receiving the function control signal to the radio communication device. Therefore, it is possible to enhance a miniaturization of the radio communication device.

Further, the radio communication device of the present invention determines whether or not it exists in the function control area by using three blocks, the judge block, the sync code block and the second block. Therefore, it is possible to determine with high preciseness whether the impossibility of receiving is caused by the location thereof in the function control area or in an area in which the signal receiving condition is not preferable.

Further, according to the present invention, the display portion of the radio communication device displays a mark indicative of existing in the function control area and a mark indicative of reservation of transmission of the reply signal, when the bearer of the device exists in the function control area. Therefore, the user can immediately confirm that he exists in the function control area. Further, it is possible to transmit the reply signal reserved by the user moving out quickly from the function control area.

Obviously, numerous additional modifications and variations of the present invention are possible in light of the above teachings. It is, therefore, to be understood that within the scope of the appended claims, the invention may be practices otherwise than as specifically described herein.

What is claimed is:

1. A radio communication system comprising:
   a function control signal transmitting device, responsive to a call signal from a base station, for transmitting a function control signal having the same frequency as that of said call signal; and
   a radio communication device for receiving said call signal and said function control signal, wherein said function control signal causes an error in said received call signal to control a predetermined function of said radio communication device.

2. A radio communication system as claimed in claim 1, said radio communication device further comprising: function control area determination means responsive to said call signal and said function control signal, for determining whether or not said radio communication device exists in function control area.

3. A radio communication system as claimed in claim 2, said radio communication device further comprising: function control means for controlling a predetermined function of said radio communication device when said function control area determination means determines that said radio communication device exists in said function control area.

4. A radio communication system comprising:
   a function control signal transmitting device, responsive to a call signal from a base station, for transmitting a function control signal having the same frequency as that of said call signal; and
   a radio communication device for receiving said call signal and said function control signal, said radio communication device comprising a function control area determination means responsive to said call signal and said function control signal, for determining whether or not said radio communication device exists in function control area,
   wherein said function control area determination means comprises means for determining whether or not said radio communication device in said function control area on the basis of the number of data errors occurred in a predetermined block of said call signal.

5. A radio communication system as claimed in claim 4, wherein said predetermined block comprises a sync code, a judge block and another block.

6. A radio communication system as claimed in claim 5, wherein the sync code, the judge block and the another block are adjacent each other.

7. A radio communication system as claimed in claim 6, wherein said function control area determination means comprises means for determining that said radio communication device exists in said function control area when the number of the data errors occurred in the sync code and the another block is equal to or smaller than a first predetermined value and the number of data errors occurred in the judge block is equal to or bigger than a second predetermined value.

8. A radio communication system as claimed in claim 1, wherein said function control signal transmitting device transmits said function control signal during a specific time period of a frame with said call signal.

9. A radio communication system as claimed in claim 8, wherein said specific time period includes a time for receiving a predetermined block of said call signal.

10. A radio communication system as claimed in claim 9, wherein said predetermined block comprises a judge block.

11. A radio communication system as claimed in claim 1, wherein said radio communication device comprises a radio selective call receiver.

12. A radio communication system as claimed in claim 11, wherein said radio selective call receiver comprises a bi-directional radio selective call receiver.

13. A radio communication system as claimed in claim 12, wherein said bi-directional radio selective call receiver comprises reply signal reservation means for reserving a reply signal to the call signal.

14. A radio communication system as claimed in claim 13, wherein said bi-directional radio selective call receiver further comprises display means for displaying whether or not said bi-directional radio selective call receiver exists in said function control area according to said function control area determination means and whether or not the reply signal is reserved according to said reply signal reservation means.

15. A radio communication system as claimed in claim 3, wherein said call signal employs the POCSAG system.

16. A radio communication system comprising:
   a function control signal transmitting device, responsive to a call signal from a base station, for transmitting a function control signal having the same frequency as that of said call signal: and
   a radio communication device for receiving said call signal and said function control signal, said radio communication device comprising:
      function control area determination means responsive to said call signal and said function control signal, for determining whether or not said radio communication device exists in function control area; and
      function control means for controlling a predetermined function of said radio communication device when said function control area determination means determines that said radio communication device exists in said function control area,
   wherein said function control area determination means comprises means for determining whether or not said radio communication device is in the function control area according to the number of data errors occurred in a predetermined codeword of said call signal.

17. A radio communication system as claimed in claim 16, wherein said predetermined codeword comprises a sync codeword, a judge codeword and another codeword.

18. A radio communication system as claimed in claim 17, wherein said sync codeword, the judge codeword and the another codeword are adjacent each other.

19. A radio communication device comprising:
   receiving means for receiving a call signal from a base station and a function control signal transmitted from a function control signal transmitting device, said function control signal having the same frequency as that of said call signal; and
   control means for controlling a predetermined function of said radio communication device in correspondence with an error in the reception of said call signal generated by said function control signal.

20. A radio communication device as claimed in claim 19, further comprising: function control area determination means responsive to said call signal and said function control signal, for determining whether or not said radio communication device exists in function control area.

21. A radio communication device as claimed in claim 20, wherein said function control means controls a predetermined function when said function control area determination means determines that said radio communication device exists in said function control area.

22. A radio communication device as claimed in claim 19, wherein said radio communication device comprises a radio selective call receiver.

23. A radio communication device as claimed in claim 22, wherein said radio selective call receiver comprises a bi-directional radio selective call receiver.

24. A radio communication device as claimed in claim 23, wherein said bi-directional radio selective call receiver comprises reply signal reservation means for reserving a reply signal to the call signal.

25. A radio communication device as claimed in claim 24, wherein said bi-directional radio selective call receiver further comprises display means for displaying whether or not said bi-directional radio selective call receiver exists in said function control area according to said function control area determination means and whether or not said reply signal is reserved according to said reply signal reservation means.

26. A control method for controlling a predetermined function of a radio communication device, the method comprising the steps of:
   receiving a call signal from a base station;
   receiving a judge block in said call signal;
   receiving another block in said call signal; and
   determining whether or not said radio communication device exists in a function control area, by receiving said judge block and said another block.

27. A control method as claimed in claim 26, further comprising the steps of:
   reserving a transmission of a reply signal; and
   displaying on display means of said radio communication device a reservation of the reply signal and whether or not said radio communication device exists in the function control area.

28. A control method for controlling a predetermined function of a radio communication device, the method comprising the steps of:
   receiving a call signal from a base station;
   receiving a judge block in said call signal;
   counting data errors occurred in said judge block;
   receiving another block in said call signal;
   counting data errors occurred in said another block; and
   controlling a function of a radio communication device on the basis of the number of data errors occurred in said judge block and the number of data errors occurred in said another block.

29. A control method as claimed in claim 28, further comprising the steps of:
   reserving a transmission of a reply signal; and
   displaying on display means of said radio communication device a reservation of the reply signal and whether or not said radio communication device exists in the function control area.

30. A control method for controlling a predetermined function of a radio communication device, the method comprising the steps of:

receiving a call signal from a base station;

determining whether it is a timing of a frame of said call signal to be received;

synchronizing the frame by a sync code in said call signal;

receiving a judge block in said call signal;

counting data errors occurred in the judge block in said call signal;

receiving another block of said call signal;

counting data errors occurred in said another block in said call signal;

comparing the number of data errors occurred in said judge block with a first predetermined value;

comparing the number of data errors occurred in said another block with a second predetermined value; and controlling a function of a radio communication device on the basis of a result of the comparison.

31. A radio communication system comprising:

a function control signal transmitting device, responsive to a call signal from a base station, for transmitting a function control signal having the same frequency as that of said call signal; and a radio communication device comprising an alerting means for alerting a user of said call signal, said radio communication device receiving said call signal and said function control signal, said function control signal for generating intentional error in said received call signal, wherein when said radio communication device detects said intentional error said alerting means is disabled.

32. A radio communication system comprising as recited in claim 31 wherein said function control signal transmitting device is located in a radio call restricted area.

* * * * *